3,210,295
METHOD OF PREPARING A TIN OXIDE-ANTI-MONY OXIDE CATALYST AND THE PRODUCT THEREOF
Jacques Modiano, Pierre-Benite, Rhone, France, assignor to Société d'Electro-Chimie d'Electro-Metallurgie et des Aciéres Electriques d'Ugine, Paris, France, a corporation of France
No Drawing. Filed Mar. 27, 1962, Ser. No. 182,978
Claims priority, application France, Mar. 29, 1961, 857,158
5 Claims. (Cl. 252—461)

This invention relates to a process for the production of a catalyst and to the resulting product; and more particularly to the preparation of a catalyst of tin and antimony oxides.

Heretofore, catalysts of this type have been prepared by oxidizing each of the metals to obtain a slurry of tin oxide on the one hand and a slurry of antimony oxide on the other hand; thereupon both slurries were blended together and then dried. The dried mass was then washed with water and filtered. There was thus obtained a mixture of fine particles of the oxides. This mixture was then agglomerated after simple drying, and then submitted to a heat treatment at an elevated temperature of 700–800° C. Such treatment caused a reaction between the oxides.

Catalysts prepared in this way have some disadvantages in that they require heat treatments at high temperatures, and also require longer contact periods with reactants than desired for carrying out various reactions.

The principal object of the invention accordingly is to provide a simple, efficient process for the production of an improved catalyst which overcomes at least some of the disadvantages in the prior process noted above, and to produce a catalyst which will require less contact time with reactants than heretofore employed in reactions employing antimony-tin oxide catalysts.

The invention comprises the novel products as well as the novel processes and steps of processes according to which such products are manufactured, the specific embodiments of which are described hereinafter by way of example, and in accordance with which I now prefer to practice the invention.

I have found in accordance with my invention that such improved catalysts may be prepared by oxidizing intimately or well mixed tin powder and antimony powder with nitric acid at 70–120° C. After such oxidation, the mixture is washed and dried at about 100–160° C. The mixture of tin and antimony powder is made of particles of tin and antimony having a particle size not over 0.5 mm. In order to obtain good results it is insufficient to react any mixture of tin and antimony with nitric acid; the mixture must be an intimate mixture. Instead of mixing the powders an alloy of tin and antimony may be powdered and employed.

The purpose of the washing of the oxidized mixture obtained in accordance with my invention is the elimination of nitric acid and such washing must be carefully done for such elimination. The drying step is employed in order to eliminate the larger part of the water. The dried mixture can then be agglomerated by compression under a pressure of several hundred kilos per cm.$^2$ It was surprising to find that this simple method gives greatly improved results as indicated below, and does not require the activation of the oxide mixture at high temperatures. In the claims where the expression "heating only to temperatures of 100–160° C. to produce the catalyst" is used, the elimination of activation at high temperatures is referred to. The product obtained in accordance with my process has a much greater catalytic activity than that obtained by the old process mentioned above.

Catalysts prepared in accordance with my invention have a large specific surface. For comparison, the tin oxide-antimony oxide catalysts heretofore prepared, have a specific surface measured by the standard Brunauer, Emmett and Teller method as described by these authors in the Journal of the American Chemical Society, 60, 309 (1938), included between 1 and 15 m.$^2$/gram whatever the Sn/Sb ratio may be. The catalysts prepared according to my invention have, after drying at a temperature as low as 160° C. or less, a much higher specific surface ranging from about 130–150 m.$^2$/gram when the tin-antimony ratio is above about 1:1.

The fact that the tin-antimony oxides of my invention do not require heating to 700–800° C. to produce their catalytic activity appears to result from the fact that the co-precipitation of the oxides by my process results in about the same association of oxides as in the old process employing temperatures of 700–800° C.

The catalysts prepared in accordance with my invention are primarily formed of an association of tin oxide and antimony oxide particles obtained at a low temperature—100–160° C., the specific surface at the temperature of utilization is above 20 m.$^2$/gram; it is all the more elevated as the Sn/Sb ratio is higher. The relative proportions of tin and antimony in the catalysts may be varied, but the atomic ratio of Sn/Sb is in the range of 1 to 10, by preference.

The catalysts of my invention may be used as oxidation catalysts in various processes. In particular, they are useful in processes for producing acrolein, acrylonitrile and their alkyl derivatives obtained by reacting an olefine with oxygen with or without ammonia. The method of preparation, according to my invention, avoids the high temperature heat treatment for activation of catalysts. The catalysts may be used in powdered condition or in agglomerated form.

The following are examples of the manner in which I now prefer to practice my invention. It is to be understood that the examples are not to be considered as limiting the invention, except as indicated in the appended claims.

*Example 1*

An intimate mixture of 300 grams of tin powder and 100 grams of antimony powder, each having a particle size of less than 0.4 mm. is oxidized in an enameled apparatus at 90° C. by aqueous 50% nitric acid until nitrous vapors are no longer given off. An aqueous slurry of antimony and tin oxides is obtained and decanted. The oxides are carefully washed and dried at 100° C. for 10 hours. A slightly bluish powder with a specific surface area of 120 m.$^2$/gram is obtained. Flattened pellets of less than 4 mm. and of the same height are made by pressing the mixture with a pressure of 0.5 metric ton/cm.$^2$. These granules so prepared have been used in a fixed bed for catalyzing the reaction of a mixture containing by volume:

| | Percent |
|---|---|
| Propylene | 5 |
| Ammonia | 6 |
| Air | 54 |
| Water vapor | 35 |

Contact of this gaseous mixture measured under normal temperature and pressure with the above catalysts at 470° C. for 1 second gave a yield of acrylonitrile of 60%. After 400 hours working the catalyst activity remained unimpaired.

As a comparison, a catalyst of the classic type, that is to say obtained from a mixture of separately precipitated oxides, treated at 800° C. during 15 hours, gave the same yield of acrylonitrile, but the contact time required is 5 seconds, measured under normal temperature and pressure.

The consequence is that to obtain a predetermined production, the use of the catalysts prepared in accordance with my invention requires an apparatus one-fifth of the volume required by the previously used catalysts, and the quantity of the catalyst required is one-fifth that of the previous catalyst. The advantage here is a particularly important one in the above reaction, because the apparatus required for such reaction is of special character, due to the high temperature used. In addition, the price of the catalysts previously employed is high in comparison with those of the present invention.

*Example 2*

A tin and antimony alloy containing 33% of antimony is powdered to a granulation less than 0.5 mm. This powder is oxidized by 50% aqueous nitric acid until no more nitrous fumes are given off. The precipitate is filtered, washed, and dried at 115° C. for 9 hours. It had a specific surface of about 130 m.$^2$/gram; pelleted at 0.8 metric ton/cm.$^2$ pressure. It is used to catalyze the same reaction as the one in Example 1. With a contact time of about 1 second, a yield of acrylonitrile of 61% is obtained.

*Example 3*

The catalyst prepared under the same conditions as in Example 2, with a contact time of about 1 second, yielded 36% acrolein from propylene.

I claim:

1. A process for the preparation of a catalyst composition, which comprises oxidizing a substance composed of intimately mixed tin and antimony powder with nitric acid to produce a composition of tin oxide and antimony oxide, and after washing, heating the oxides only at a temperature of about 100–160° C. to produce the catalyst.

2. A process for the preparation of a catalyst composition, which comprises oxidizing a substance composed of intimately mixed tin and antimony powder, having a particle size not over 0.5 mm. with a ratio of tin to antimony in the range of 1 to 10, with nitric acid to produce a composition of tin oxide and antimony oxide, and after washing, heating the oxides only at a temperature of about 100–160° C. to produce the catalyst.

3. A process for the preparation of a catalyst composition, which comprises oxidizing a substance composed of intimately mixed tin and antimony powder of a particle size of less than 0.4 mm. with a ratio of tin to antimony in the range 1 to 10, with about 50% nitric acid to produce a composition of tin oxide and antimony oxide, and after washing, heating the oxides only at a temperature of about 100–160° C. to produce the catalyst.

4. A process for the preparation of a catalyst composition, which comprises oxidizing a substance composed of an intimately mixed powdered tin-antimony alloy with nitric acid to produce a composition of tin oxide and antimony oxide, and after washing, heating the oxides only at a temperature of about 100–160° C. to produce the catalyst.

5. An oxidation catalyst prepared by oxidizing a substance composed of intimately mixed tin and antimony powder with nitric acid to produce a composition of tin oxide and antimony oxide, and after washing, heating the oxide only at a temperature of about 100–160° C. to produce the catalyst.

References Cited by the Examiner

UNITED STATES PATENTS

| | | | |
|---|---|---|---|
| 3,094,552 | 6/63 | Wood | 252—461 X |
| 3,094,565 | 6/63 | Bethell et al. | 252—456 X |
| 3,149,914 | 9/64 | Bellringer et al. | 23—151 |
| 3,152,170 | 10/64 | Barclay et al. | 252—461 X |

FOREIGN PATENTS 718,723    11/54    Great Britain.

MAURICE A. BRINDISI, *Primary Examiner.*